US012659787B2

(12) United States Patent
Kulkarni et al.

(10) Patent No.: US 12,659,787 B2
(45) Date of Patent: Jun. 16, 2026

(54) DYNAMIC TRAFFIC IDENTIFIER MAPPING BASED ON INTERNET-OF-THINGS DEVICE PRESENCE

(71) Applicant: Cisco Technology, Inc., San Jose, CA (US)

(72) Inventors: Santosh B. Kulkarni, Sunnyvale, CA (US); Vishal S. Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 77 days.

(21) Appl. No.: 18/666,361

(22) Filed: May 16, 2024

(65) Prior Publication Data

US 2025/0358669 A1     Nov. 20, 2025

(51) Int. Cl.
*G06F 15/173*     (2006.01)
*H04W 28/02*     (2009.01)

(52) U.S. Cl.
CPC ... *H04W 28/0263* (2013.01); *H04W 28/0236* (2013.01); *H04W 28/0268* (2013.01)

(58) Field of Classification Search
None
See application file for complete search history.

(56) References Cited

U.S. PATENT DOCUMENTS

2019/0260707 A1 *  8/2019  Kesavan ................. H04W 4/70
2023/0139206 A1 *  5/2023  Cariou .................. H04W 76/15
                                                          370/328

2023/0156840 A1     5/2023  Chitrakar et al.
2023/0262807 A1 *  8/2023  Jiang ..................... H04W 76/15
                                                          370/329
2023/0403545 A1    12/2023  Patil et al.
2024/0007904 A1     1/2024  Ratnam et al.

FOREIGN PATENT DOCUMENTS

WO          2023092411 A1     6/2023

OTHER PUBLICATIONS

IEEE: "IEEE P802.11be™/D1.4, Draft Standard for Information Technology-Tele-Communications and Information Exchange Between Systems Local and Metropolitan Area Networks-Specific Requirements, Part 11: Wireless LAN Medium Access Control (MAC) and Physical Layer (PHY) Specifications, Amendment 8: Enhancements for Extremely High Throughput (EHT)", LAN/MAN Standards Committee of the IEEE Computer Society, Jan. 2022, pp. 1-787.
Monajemi P., et al., "Comment Resolution for Enterprise-Grade TID Mapping", IEEE P802.11 Wireless LANs, doc.: IEEE 802.11-21/1793r0, Nov. 6, 2021, pp. 1-8.

* cited by examiner

*Primary Examiner* — Quang N Nguyen
*Assistant Examiner* — Andrew Woo
(74) *Attorney, Agent, or Firm* — Patterson + Sheridan, LLP

(57)     ABSTRACT

Techniques for dynamic TID mapping are provided. A network device creates an Internet-of-things (IoT) traffic identifier (TID) for IoT traffic. The network device determines a first operational spectrum for the IoT TID. The network device maps the IoT TID to access one or more links operating on the first operational spectrum, between the network device and the IoT device. The network device communicates the TID and the one or more links to the IoT device.

20 Claims, 9 Drawing Sheets

700

CREATE, BY A NETWORK DEVICE, AN INTERNET-OF-THINGS (IOT) TRAFFIC IDENTIFIER (TID) FOR IOT TRAFFIC       705

DETERMINE A FIRST OPERATIONAL SPECTRUM FOR THE IOT TID       710

MAP THE IOT TID TO ACCESS ONE OR MORE LINKS OPERATING ON THE FIRST OPERATIONAL SPECTRUM, BETWEEN THE NETWORK DEVICE AND AN IOT DEVICE       715

COMMUNICATE THE IOT TID AND THE ONE OR MORE LINKS TO THE IOT DEVICE       720

100

105

150

IoT
Traffic

BK/BE/VI Traffic

145

Low-Latency
Traffic

140

115

IoT Device

VO/Low-
Latency
Traffic

135

VI
Traffic

130

BE
Traffic

125

BK
Traffic

120

110

Non-IoT Device

500

CREATE A NEW TID
FOR IOT TRAFFIC
STREAM(S) — 505

SELECT A
FREQUENCY BAND — 510

MAP THE NEW TID
TO LINKS
OPERATING ON THE
SELECTED
FREQUENCY BAND — 515

BROADCAST THE
NEW TID
CONFIGURATION — 520

MONITOR NETWORK
CONDITIONS AND
DEVICE STATUSES — 525

REMAPPING
NEEDED? — 530    NO

YES

MAP THE NEW TID
TO LINKS
OPERATING ON
ANOTHER
FREQUENCY BAND — 535

600

ASSIGN IOT TRAFFIC STREAM(S) TO A PREDEFINED TID — 605

MAP THE PREDEFINED TID TO LINKS OPERATING ACROSS MULTIPLE FREQUENCY BANDS — 610

BROADCAST THE NEW TID CONFIGURATION — 615

MONITOR NETWORK CONDITIONS AND DEVICE STATUSES — 620

COORDINATE NON-IOT TRAFFIC WITH IOT TRAFFIC — 625

REMAPPING NEEDED? — 630

NO

YES

REMOVE IOT TRAFFIC STREAM(S) FROM THE PREDEFINED TID — 635

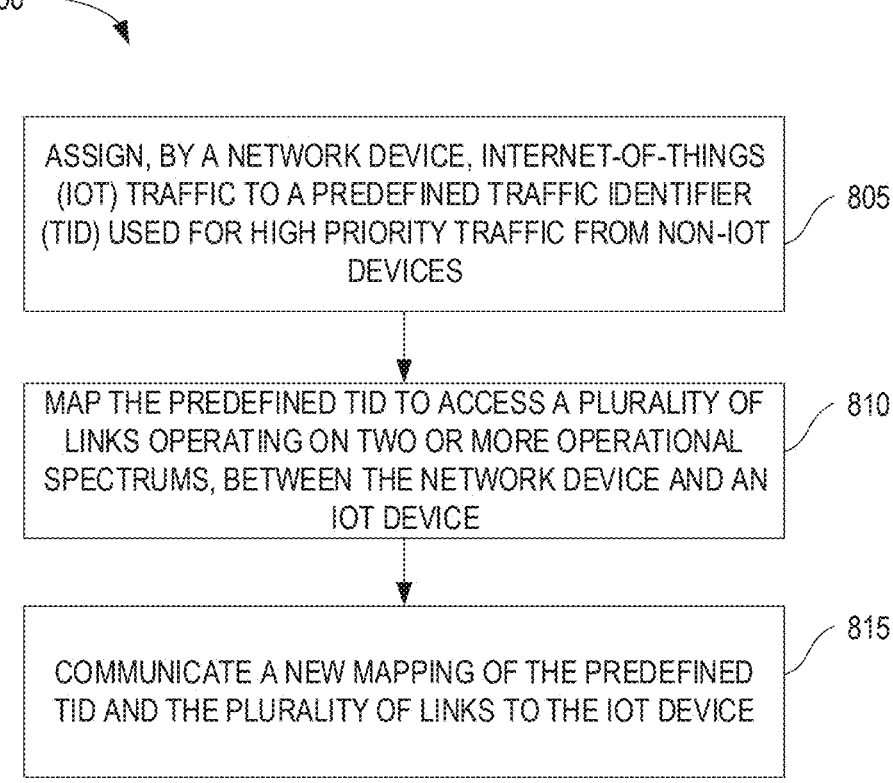

800

ASSIGN, BY A NETWORK DEVICE, INTERNET-OF-THINGS (IOT) TRAFFIC TO A PREDEFINED TRAFFIC IDENTIFIER (TID) USED FOR HIGH PRIORITY TRAFFIC FROM NON-IOT DEVICES — 805

MAP THE PREDEFINED TID TO ACCESS A PLURALITY OF LINKS OPERATING ON TWO OR MORE OPERATIONAL SPECTRUMS, BETWEEN THE NETWORK DEVICE AND AN IOT DEVICE — 810

COMMUNICATE A NEW MAPPING OF THE PREDEFINED TID AND THE PLURALITY OF LINKS TO THE IOT DEVICE — 815

*FIG. 8*

DYNAMIC TRAFFIC IDENTIFIER MAPPING BASED ON INTERNET-OF-THINGS DEVICE PRESENCE

TECHNICAL FIELD

Embodiments presented in this disclosure generally relate to wireless communication. More specifically, embodiments disclosed herein relate to dynamic traffic identifier (TID) mapping based on the presence of Internet-of-things (IoT) devices.

BACKGROUND

One of the key features of Wi-Fi 7 (IEEE 802.11be) is multi-link operation (MLO). This technology allows a client multi-link device (MLD) to concurrently associate with multiple links, such as 2.4 GHz, 5 GHz, and 6 GHz links, to the same access point multi-link device (AP MLD). The MLO enhances the latency, throughput, and reliability of the network connection, offering a more robust and efficient wireless communication experience.

Wi-Fi 7 further introduces TID-to-link mapping as an enhancement to MLO, which allows MLDs to assign a specific set of links to traffic associated with each TID. The TID-to-link mapping is particularly useful in high-density networks, providing a mechanism to prioritize low-latency traffic. For example, TIDs for low-latency traffic, like voice traffic, may be mapped exclusively to 6 GHz links, where the medium is less congested compared to the more commonly used 2.4 GHz and 5 GHz links. A conventional mapping scheme might assign all TIDs to both 2.4 GHz and 5 GHz links due to their broader compatibility, while reserving the 6 GHz links for low-latency TIDs to ensure improved performance and reduced interference.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 8 is a flow diagram depicting an example method for TID mapping, with IoT traffic mapped to predefined TIDs, according to some embodiments of the present disclosure.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
FIG. 1 depicts an example wireless network environment where a variety of traffic streams are transmitted between IoT and non-IoT devices and their associated AP, according to some embodiments of the present disclosure.

One embodiment presented in this disclosure provides a method, including creating, by a network device, an Internet-of-things (IoT) traffic identifier (TID) for IoT traffic, determining a first operational spectrum for the IoT TID, mapping the IoT TID to access one or more links operating on the first operational spectrum, between the network device and an IoT device, and communicating the IoT TID and the one or more links to the IoT device.

One embodiment presented in this disclosure provides a method, including assigning, assigning, by a network device, Internet-of-things (IoT) traffic to a predefined traffic identifier (TID) used for high priority traffic from non-IoT devices, mapping the predefined TID to access a plurality of links operating on two or more operational spectrums, between the network device and an IoT device, and communicating a new mapping of the predefined TID and the plurality of links to the IoT device.

Other embodiments in this disclosure provide one or more non-transitory computer-readable media containing, in any combination, computer program code that, when executed by operation of a computer system, performs operations in accordance with one or more of the above methods, as well as systems comprising one or more computer processors and one or more memories collectively containing one or more programs, which, when executed by the one or more computer processors, perform operations in accordance with one or more of the above methods.

Example Embodiments

The present disclosure provides techniques for dynamic TID mapping upon detecting IoT devices.

The TID-to-mapping feature in Wi-Fi 7 optimizes network performance by allocating bandwidth more efficiently and reducing contention and interference, such as by restricting 6 GHz links to only low-latency TIDs. Such a mapping scheme may ensure that time-sensitive traffic, like voice and video data, is transmitted over the less congested channels, and therefore maintain a high quality of service. The mapping scheme may be broadcasted to a basic service set (BSS) by an AP, and followed by all associated stations (STAs) to achieve enhanced network performance.

While this mechanism is well-suited for non-IoT devices that are not power sensitive (typically being cable-powered or with large batteries) and have substantial airtime demands, its effectiveness can be limited for IoT devices. One reason is that IoT devices are typically battery-powered and designed for low power consumption. Frequently switching between links according to TID-to-link mapping may significantly increase power usage, which is undesirable for IoT devices intended for long operational periods without recharging. Furthermore, many IoT devices generate simple and periodic traffic patterns. The complex prioritization offered by the TID mapping may introduce undue overhead that may impair the performance of IoT devices, especially for those operating in the enhanced multi-link single-radio (eMLSR) mode. This is because eMLSR is designed to manage multiple connections efficiently, and the added complexity of TID-to-link mapping may outweigh the benefits for devices with basic communication needs.

Embodiments of the present disclosure introduce mechanisms or systems that facilitate dynamic TID-to-link mapping for traffic associated with IoT devices. The dynamic mapping enhances IoT devices' network performance in high-density environments while simultaneously achieving efficient traffic management for non-IoT devices. The mechanisms ensure that non-IoT devices continue to benefit from TID-to-link mapping while avoiding (or at least mitigating) the need for IoT devices to perform frequent switching between frequency bands due to mapping rules.

As used herein, IoT devices refer to devices designed to be low-power, and/or with typical, maximum, and/or expected traffic volume or flow below a defined threshold, therefore having a minimal impact on airtime. Examples of IoT devices may include, but are not limited to, smart sensors, smart detectors, and wearable health monitors. In some embodiments, IoT devices may be battery-powered and/or signal-link capable (e.g., operating in eMLSR even if associated in multi-link mode). When following the conventional TID-to-link mapping rules, IoT devices may be forced to frequently switch between frequency bands (e.g., from the 2.4 GHz band to the 6 GHz band). Such frequent switching may lead to increased power consumption, which contradicts the low-power design principles of the IoT devices, and even introduces undue overhead and complexity that degrade their network performance and efficiency.

As used herein, non-IoT devices refer to devices that support high power operation, and/or are capable of conducting complex data processing with high throughput consumption. The non-IoT devices may include, but are not limited to, laptops, smartphones, and tablets, which require continuous connectivity to support real-time interactions and bandwidth-intensive applications. In some embodiments, non-IoT devices may be cable-powered or equipped with large (often rechargeable) batteries, which allows for extended use without the immediate need for power conservation as required by IoT devices. In some embodiments, non-IoT devices may be multi-link capable, maintaining several concurrent connections across different frequency bands (e.g., 2.4 GHz, 5 GHz, and 6 GHz). The concurrent connections allow non-IoT devices to adhere to TID-to-link mapping without frequent switching. By distributing traffic across available links based on the TID mapping, non-IoT devices optimize their network performance and enhance both throughput and reliability without experiencing the adverse effects observed in IoT devices.

In one embodiment of the present disclosure, an AP within a BSS may create a new TID specifically for traffic generated (or managed) by IoT devices. Although IoT traffic may include various types with different quality of service (QOS) requirements (ranging from low-latency traffic traditionally mapped to TID 7 to background traffic mapped to TID 0), all these types share the common characteristics of small data volumes and minimal airtime consumption. Therefore, aggregating these diverse traffic types under a single TID and assigning them to a specific frequency band (e.g., 6 GHz) may not significantly impact overall network performance due to IoT traffic's inherently low demand on network resources.

Following the creation of the new TID, the AP may proceed to select a frequency band that optimally aligns with the operational needs and constraints of IoT devices and/or non-IoT devices. In some embodiments, a variety of factors may be considered during the selection, such as the device compatibility and battery status, available spectrum and their network conditions, and the QoS requirements of the aggregated IoT traffic streams. Once the frequency band (e.g., 6 GHz) is selected, the AP may then map the new TID to access links operating on the selected frequency band. Following the new TID-to-link mapping, all IoT traffic streams, despite their varying QoS requirements, are transmitted exclusively on the selected band. By consolidating IoT traffic within a single frequency band and eliminating the need for frequent switching, the system may reduce both the overhead of data processing and the power usage of IoT devices. The approach of creating IoT-specific TID improves the IoT devices' overall performance, enhancing their longevity and reliability in high-density network environments.

In one embodiment of the present disclosure, instead of creating a new TID, the AP may refine the management of IoT traffic by assigning it to a predefined (or existing) TID. For example, in some embodiments, the predefined TID may be one reserved for voice (low-latency) traffic, which is mapped to access high-speed links operating on the 6 GHz band. IoT traffic streams, regardless of their varying types and QoS requirements, share common characteristics in that they are small in data volumes and consume minimal airtime. Given the common characteristics, assigning IoT traffic to an existing TID may have a minimal impact on the performance of non-IoT traffic under the same TID. In some embodiments, the predefined TID may be mapped to access links operating across multiple frequency bands (e.g., 2.4 GHz, 5 GHz, and 6 GHz). The AP may then coordinate between the non-IoT traffic (e.g., voice/low-latency traffic) reserved for the selected TID (e.g., TID 7) and IoT traffic. For example, the AP may dynamically allocate IoT traffic to one of the available frequency bands, while allocating the other available frequency bands for the non-IoT traffic. In coordinating traffic and performing link mapping, the AP may consider the current IoT and non-IoT traffic loads and their respective QoS requirements. In some embodiments, the AP may prioritize non-IoT traffic over IoT traffic. When there is high demand for non-IoT traffic, the 6 GHz links may be reserved exclusively for non-IoT traffic, and IoT traffic may be directed to either 5 GHz or 2.4 GHz links, depending on their device compatibility. When there is lower demand for non-IoT traffic, the 6 GHz links may accommodate both types of traffic. The dynamic mapping ensures that IoT devices can maintain high performance levels without the need for frequent band switching, which therefore conserves power and reduces latency.

FIG. 1 depicts an example wireless network environment 100 where a variety of traffic streams are transmitted between IoT and non-IoT devices and their associated AP, according to some embodiments of the present disclosure.

In the illustrated network environment 100, an AP 105 is shown to be associated with a non-IoT device 110 and an IoT device 115. As discussed above, non-IoT devices may refer to devices that support high-power operations and complex data processing. Therefore, non-IoT device typically consume considerable airtime for data transmission. Examples of non-IoT devices may include laptops, smartphones, tablets, and other devices that requires high bandwidth and are used for data-intensive applications. As illustrated, non-IoT device 110 transmits traffic streams 120-135 with varying QoS requirements to AP 105. Based on their QoS needs, these traffic streams 120-135 may be categorized into different types, such as background (BK) traffic 120, Best Effort (BE) traffic 125, Video (VI) traffic 130, and Voice (VO) traffic 135 (also referred to in some embodiments as low-latency traffic). Each type of traffic is then mapped to one or more specific TID(s) to optimize network performance and resource allocation. For example, BK traffic 120, which generally has the lowest priority, may be mapped to TIDs 0-3, and utilize links that prioritize efficiency over speed. BE traffic 125 represents standard priority data, and may also utilize TIDs 0-3 and share the spectrum with BK traffic. VI traffic 130 generally requires high bandwidth and low latency for smooth video playback, and may be mapped to TIDs 4-5 for fast data rates and reduced jitter. VO traffic 135, which demands the lowest latency for clear and uninterrupted voice transmission, is typically mapped to the highest priority TIDs 6-7 for most reliable and fastest connection.

In some embodiments, the non-IoT device 110 may be a multi-link device (MLD), and therefore capable of maintaining multiple connection links across different frequency bands (e.g., 2.4 GHz, 5 GHz, and 6 GHz) with the AP 105. More detail is discussed with reference to FIG. 2. This multi-link capability allows for the transmission and/or reception of different types of traffic streams over different links, following the TID-to-link mapping rules designed to optimize network performance and efficiency. For example, TID-to-link mapping rules may define that traffic categorized within TIDs 6 and 7 (e.g., VO traffic) uses links operating at 6 GHz, traffic within TIDs 4 and 5 (e.g., VI traffic) uses links at 5 GHz, and traffic mapped to TIDs 0-3 (e.g., BE traffic, BK traffic) may use links operating at 2.4 GHz. When concurrent transmission of multiple types of traffic is requested between the AP 105 and the non-IoT device 110, both entities, following the TID-to-link mapping guidelines, may transmit VO traffic using 6 GHz links, VI traffic through 5 GHz links, and BE/BK traffic using 2.4 GHz links simultaneously. Such multi-link connections eliminate the need for band switching, and ensure that each traffic type is optimally served according to its QoS requirements.

In the illustrated environment 100, the AP 105 is also connected to an IoT device 115. As discussed above, IoT devices may refer to devices that maintain low power consumption and have typical, maximum, and/or expected traffic volume or flow below a defined threshold, therefore consuming minimal airtime. Examples of such IoT devices include smart sensors, smart detectors, and wearable health monitors. The IoT devices, known for their efficiency, may operate as single-link devices or in an eMLSR mode when associated in a multi-link configuration. As illustrated, the traffic streams transmitted between the AP 105 and the IoT device 115, though having small volumes and consuming only minimal airtime, may still include varying QoS requirements, thus allowing them to be categorized into different types, such as low-latency (or voice) traffic 140, VI, BE, or BK traffic 145. The IoT device 115 must perform frequent adaptions or link switching when it operates in single-link mode or utilizes the eMLSR mode for managing multiple links. This is because the convention TID-to-mapping rules require the IoT device 115 to assign VI traffic to 6 GHz links, VO traffic to 5 GHz links, and Bk/BE traffic to 2.4 GHz links. For example, when operating in single-link mode, the IoT device 115 may adjust its operating frequency according to the type of traffic being transmitted. For IoT devices in the eMLSR mode, these devices may conduct frequent switching between different links based on the traffic type. Such frequent adaptions or switching may lead to increased power usage, which contradicts the low-power design principles inherent to IoT devices. Additionally, the frequent adaptions or switching may introduce undue overhead, increasing latency and potentially degrading network performance.

To minimize (or at least reduce) the need for frequent band switches or link changes, the TID-to-link mapping strategy may be refined to accommodate the unique operational characteristics of the IoT devices 115. As illustrated, the various types of traffic streams transmitted between the AP 105 and the IoT device 115 may be aggregated into a single category, like IoT traffic 150, regardless of their distinct QoS requirements. The aggregated IoT traffic may be assigned to either a new TID or a predefined TID, and then mapped to a selected frequency band (e.g., 5 GHz) from the available spectrum. More detail for the updated TID mapping is discussed with reference to FIGS. 3 and 4. Following the updated TID mapping rules, IoT traffic 150 may be transmitted using links operating at the selected frequency band (e.g., 5 GHz) without the need for frequent adaptions or switching. Implementing the updated TID mapping may help to conserve power and reduce operational overhead, which is particularly beneficial for maintaining the efficiency and longevity of the power-sensitive IoT device 115.

Although the AP 105 connecting to the non-IoT device 110 and the IoT device 115 is depicted for conceptual clarity, in some embodiments, the AP 105 may connect to any number of IoT devices or non-IoT devices, and all the connected client devices and the AP 105 form a BSS.

Figure 2:
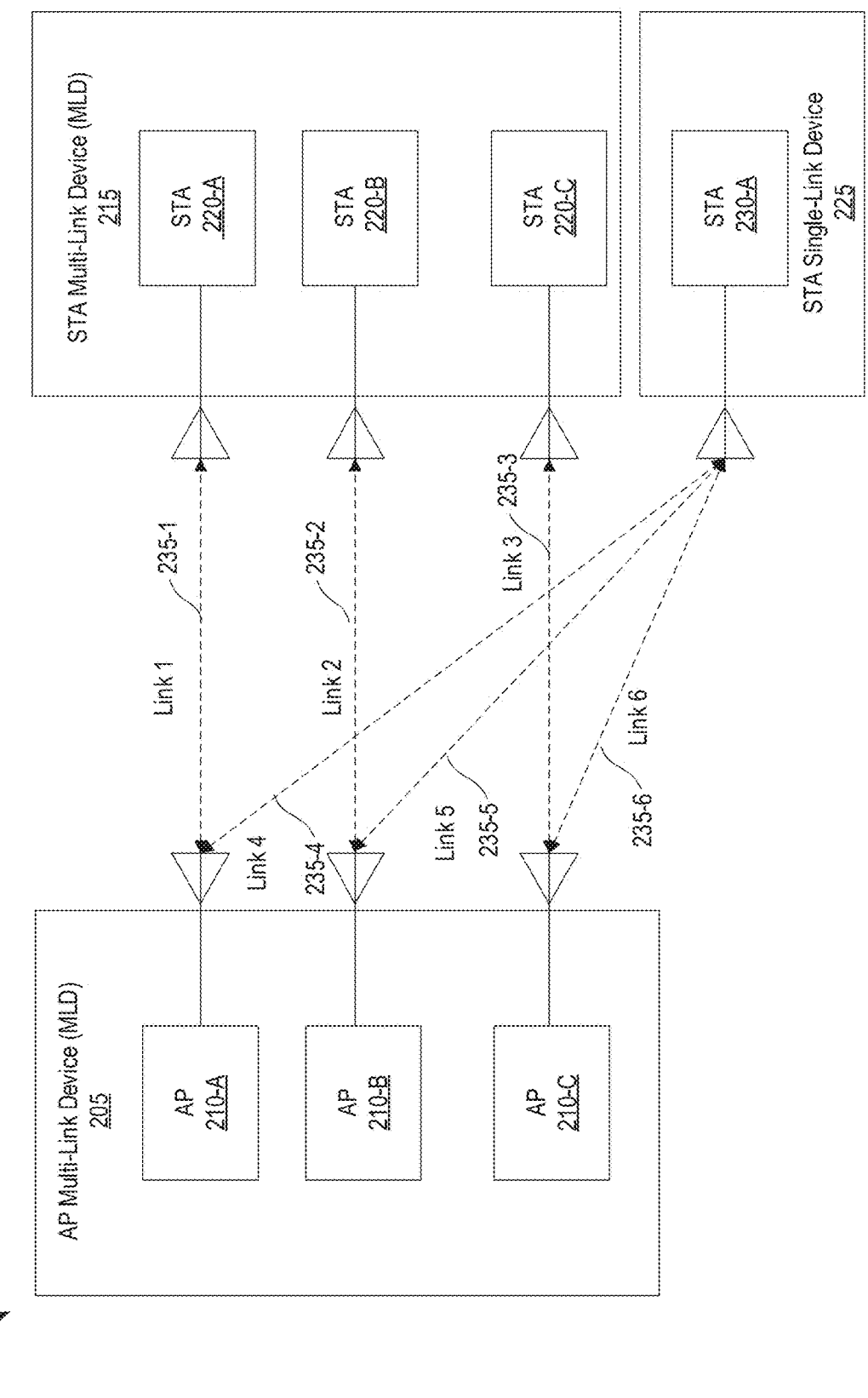
FIG. 2 depicts an example BSS where a multi-link AP connects to a multi-link STA and a single-link STA, according to some embodiments of the present disclosure.

FIG. 2 depicts an example BSS 200 where a multi-link AP connects to a multi-link STA and a single-link STA, according to some embodiments of the present disclosure.

In the illustrated BSS 200, the AP MLD 205 is connected to a STA MLD 215 (e.g., a station or client device acting as a multi-link device) and a single-link STA 225 (e.g., a station or client device acting as a single-link device) through a set of links 235. In some embodiments, the STA MLD 215 may correspond to the non-IoT device 110 as depicted in FIG. 1. In some embodiments, the single-link STA 225 may correspond to the IoT device 115 as depicted in FIG. 1. In some embodiments, the AP MLD 205 may correspond to the AP 105 as depicted in FIG. 1.

As illustrated, the AP MLD 205 comprises three radio interfaces, AP 210-A, AP 210-B, and AP 210-C, each with a unique MAC address and connected to one or more antennas. The STA MLD 215 comprises three radio interfaces, STA 220-A, STA 220-B, and STA 220-C, each with a unique MAC address and one or more antennas. The STA MLD 215 and the AP MLD 205 establish connections through three links, link 1 (235-1), link 2 (235-2), and link 3 (235-3). In some embodiments, each link has a unique link ID and operates on a designated frequency band. For example, link 1 (235-1) connects AP 210-A and STA 220-A on the 2.4 GHz band, link 2 (235-2) connects AP 210-B and STA 220-B on the 5 GHz band, and link 3 (235-3) connects AP 210-C and STA 220-C on the 6 GHz band.

As illustrated, the single-link STA 225 comprises a radio interface, STA 230-A. Although the STA 225 is a single-link device, it may maintain multiple links across different frequency bands when operating in the eMLSR mode. As illustrated, link 4 (235-4) connects STA 230-A and AP 210-A operating at 2.4 GHz, link 5 (235-5) connects STA 230-A and AP 210-B operating at 5 GHz, and link 6 (235-6) connects STA 230-A and AP 210-C operating at 6 GHz. When adhering to convention TID-to-link mapping, both the STA MLD 215 and the single-link STA 225 may transmit different types of traffic streams using different links based on their designated TIDs. For example, the STA MLD 215 and the single-link STA 225 may transmit VO (or low-latency) traffic via links 3 (235-3) and 6 (235-6) at 6 GHz, VI traffic via links 2 (235-2) and 5 (235-5) at 5 GHz, and BE or BK traffic via links 1 (235-1) and 4 (235-4) at 2.4 GHz. Such transmission using different links may be optimal for the STA MLD 215, which maintains multiple concurrent connection links (e.g., 235-1, 235-2, and 235-3), but it is not suitable for the single-link STA 225. In order to transmit traffic streams in accordance with the defined TID mapping rules, the single-link STA 225 may need to frequently switch between links. For example, the single-link STA 225 may have to transition from link 6 (235-6) to link 4 (235-4) when low-latency traffic (e.g., 140 of FIG. 1) is followed by BE traffic (e.g., 145 of FIG. 1). The frequent switch or link changes may lead to increased power usage. When the single-link STA 225 corresponds to a IoT device that is battery-powered and designed for low power consumption, the resultant increase in power usage from frequent link switching may potential impact the device's operational efficiency and battery life. Therefore, an updated TID-to-link mapping strategy is required to accommodate the unique characteristics of the single-link device 225. The updated strategy should minimize (or at least reduce) the device's need for frequent band switches or link changes, and thus preserve energy efficiency and maintain quality service. More detail is discussed with reference to FIGS. 3 and 4.

The AP MLD 205 and STA MLD 215 are generally representative of any device capable of performing multilink operations. The single-link STA 225 is generally representative of any device capable of performing single link operations. Although the AP MLD 205, the STA MLD 215, and the single-link STA 225 are depicted for conceptual clarity, in some embodiments, the AP MLD 205 may connect to any number of STA MLDs or single-link STAs.

In the illustrated example, AP MLD 205 is depicted as having three radio interfaces, in some embodiments, the AP MLD 205 may use any number of APs 210 (including one). Similarly, though the STA MLD 215 is depicted as each having three radio interfaces 220 in the illustrated example, in some embodiments, each STA MLD may have any number of STAs 220 (including one).

As illustrated, the APs 210 each have one antenna. In some embodiments, each AP 210 may have any number of antennas. Similarly, though the STAs 220 and STA 230 each have one antenna in the illustrated example, in some embodiments, each STA 220 or 230 may have any number of antennas.

In some embodiments of the present disclosure, the AP MLD 205 and the STA MLD 215 may generally be referred to collectively as "MLDs" or "multi-link devices," indicating that they are capable of using multiple communication links 235, whether using one link at a time, or using multiple links in parallel to transmit and/or receive data. In some embodiments, the single-link STA 225 may generally be referred to collectively as a "SLD" or "single-link device," indicating that it is only capable of using one communication link at a time. The depicted single-link STA 225 is operating in eMLSR mode, suggesting that it can maintain multiple links. The depicted single-link STA 225 is provided for conceptual clarity. In some embodiments, single-link devices may not have this capability. Instead, single-link devices may operate in a traditional single-link mode where the devices adapt their respective frequency band settings each time when handling a new type of traffic stream.

In some embodiments, the AP MLD 205 may be generally referred to as simply an "AP," and the STA MLD 215 and single-link STA 225 may generally be referred to as simply a "STA" or "client device." Generally, the AP MLD 205 corresponds to an access point device that provides connectivity to a local wireless network (e.g., WiFi), while the STA MLD 215 and single-link STA 225 correspond to a station or client device connected to the local wireless network via the AP MLD 205.

Figure 3:
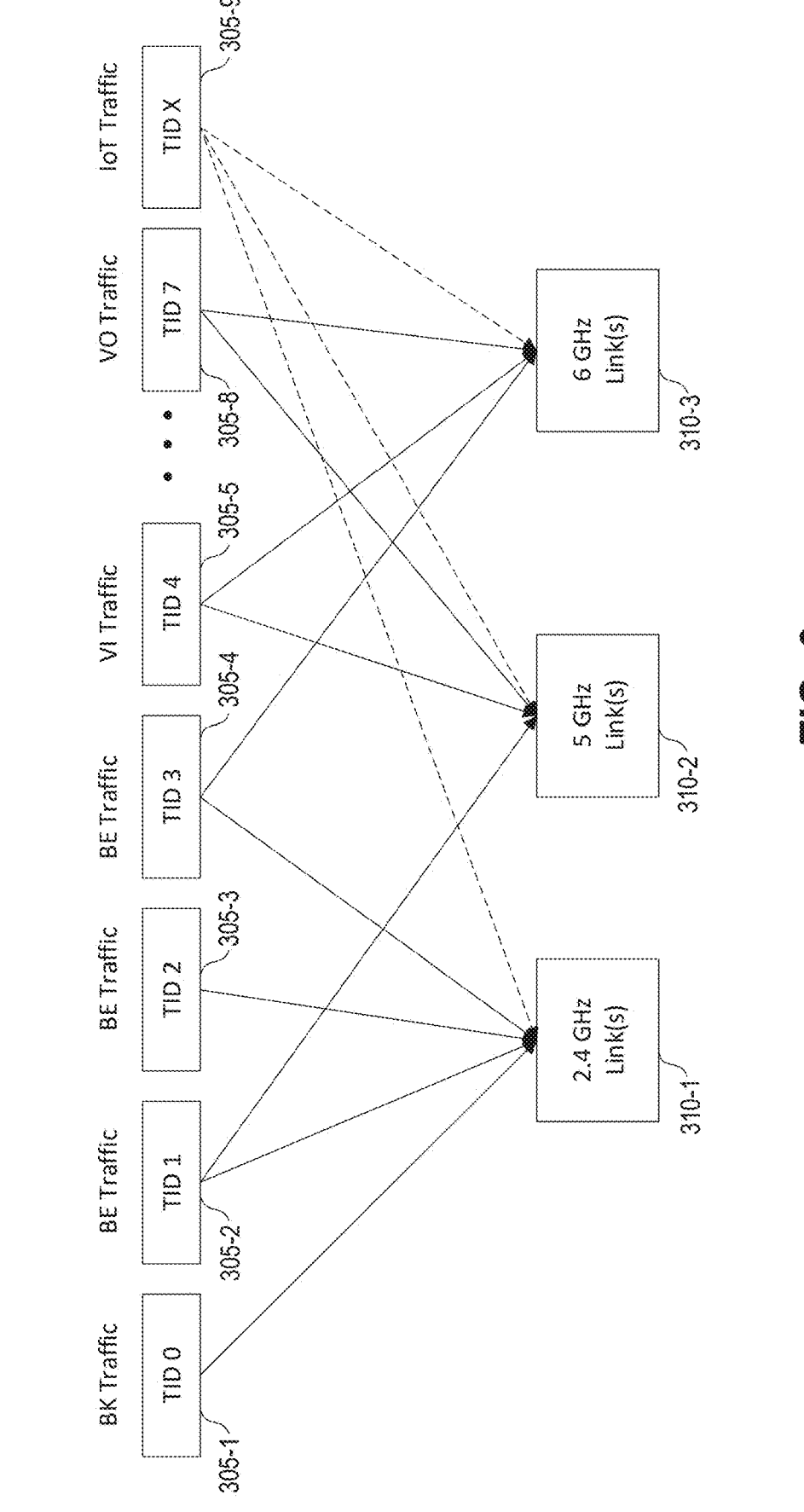
FIG. 3 depicts an example TID-to-link mapping scheme with a new TID created for IoT traffic, according to some embodiments of the present disclosure.

FIG. 3 depicts an example TID-to-link mapping scheme 300 with a new TID created for IoT traffic, according to some embodiments of the present disclosure.

In the illustrated example, TID-to-link mapping scheme 300, background (BK) traffic is categorized under TID 0 (305-1), and mapped to access links operating on the 2.4 GHz band (310-1) (e.g., links 1 and 4 of FIG. 2). Best effort (BE) traffic is categorized under TIDs 1-3, with TID 1 (305-2) mapped to access both 2.4 GHz links (310-1) and 5 GHz links (310-2) (e.g., links 2 and 5 of FIG. 2), TID 2 (310-3) solely to 2.4 GHz links (310-1), and TID 3 (310-4) to both 2.4 GHz links (310-1) and 6 GHz links (310-3) (e.g., links 3 and 6 of FIG. 2). Video (VI) traffic is allocated to TID 4 (310-5), and mapped to access links on both 5 GHz (310-2) and 6 GHz bands (310-3). Voice (VO) traffic is allocated to TID 7 (310-8), and is mapped to access links on the 5 GHz (310-2) and 6 GHz bands (310-3).

In the illustrated example, various types of traffic from IoT devices (e.g., low-latency traffic 140 and BK/BE/VI traffic 145 as depicted in FIG. 1) are aggregated as IoT traffic, and allocated to a newly created TID X (305-9). The new TID is then mapped to a single frequency band (also referred to in some embodiments as an operational spectrum), selected from all available bands, such as 2.4 GHz, 5 GHz, and 6 GHz (indicated by dashed arrows). The choice of the frequency band and its associated links is determined by evaluating a variety of factors that accommodate the characteristics of IoT devices and/or non-IoT devices. In some embodiments, the factors may include, but are not limited to, the compatibility of each IoT device (e.g., supported frequency bands), the status of available frequency bands and their network conditions (e.g., to avoid interfering with non-IoT devices or high priority traffic on one or more links), and the QoS requirements of the IoT traffic streams.

In some embodiments, such as when multiple IoT devices (e.g., 115 of FIG. 1) connect to the same AP (e.g., 105 of FIG. 1), the AP may select the most suitable band by determining the lowest common denominator (LCD) among the supported frequency bands of the connected IoT devices. For example, if five IoT devices are connected to the same AP, with three supporting 2.4 GHz, 5 GHz, and 6 GHz, and the other two only supporting 2.4 GHz and 5 GHz, the LCD, either 2.4 GHz or 5 GHz, is selected. This approach ensures that the selected frequency band for the new TID X (305-9) can accommodate all connected IoT devices. When the LCD is limited to a single frequency band, like 2.4 GHz, the new TID X (305-9) should be mapped to that band to ensure all IoT devices can access the network. When the LCD reveals more than one frequency band, as in the provided example of 2.4 GHz and 5 GHz, additional factors may need to be considered to make an optimal selection.

In some embodiments, to further decide between these bands, the AP may perform a detailed analysis of each available frequency band (e.g., 2.4 GHz, 5 GHz, and 6 GHz). The analysis may include evaluating a range of factors, including the current network congestion levels, co-channel interference severity, potential radar signal disruptions or incumbent user presence, and any limitations on the effective isotropic radiated power (EIRP) budget imposed on each band. Through the thorough assessment, the AP may determine which frequency band provides more favorable network conditions for IoT traffic (e.g., 150 of FIG. 1), to ensure optimal operation and efficiency.

Additionally, in some embodiments, the AP may consider the QoS requirements of IoT traffic streams. If the IoT traffic streams (or the majority of the streams) require low latency and/or high reliability, then the 5 GHz band may be more preferable due to its typically low congestion and higher data rates compared to the 2.4 GHz band. However, if the traffic streams do not have stringent requirements for latency and throughput, and the IoT devices are primarily located in an environment with a high density of 5 GHz networks, the 2.5 GHz band may be more suitable despite its generally higher congestion and lower speeds. The decision-making process ensures that the selected frequency band optimally supports the operational requirements and performance expectations of the connected IoT devices. Once the frequency band is selected, the new TID X (305-9) is mapped to links operating on that band. For example, if 5 GHz is selected, the new TID X (305-9) is mapped to 5 GHz links (310-2) (e.g., links 2 and 5 of FIG. 2). By centralizing IoT traffic on a single and optimally selected frequency band, the IoT devices no longer need to perform frequent band switches or adaptions when handling different types of traffic (e.g., low-latency traffic 140 and BK/BE/VO traffic 145 of FIG. 1). Therefore, the updated TID-to-link mapping scheme 300 not only simplifies network management but also improves the operational efficiency and reliability of IoT devices.

In some embodiments, the AP may need to renegotiate or adjust the links mapped to the new TID X (305-9) in response to the dynamic states of IoT devices or changing network conditions. For example, in some embodiments, if an IoT device associated with the AP exhibits a significant change in battery status, such as a shift towards energy conservation mode, the AP may decide to switch the new TID X from the 5/6 GHz band to the 2.4 GHz band. The 2.4 GHz band, with its longer range and better penetration through obstacles, can reduce the power required for data transmission, and therefore conserve the IoT device's battery life. In some embodiments, such as when an IoT device enters an extended sleep pattern (which is target wake time (TWT) initiated), the 2.4 GHz band may be more suitable to accommodate the unique needs of IoT device in reducing power usage and saving its battery life. In some embodiments, such as when a high level of co-channel interference and/or a significant reduction in the active link EIRP budget (potentially due to automatic frequency coordination (AFC) mandates that adjust power levels to avoid interference with incumbent services) are detected on the 5/6 GHz band, the AP may also switch the mapping of the new TID from 5/6 GHz band to the 2.4 GHz band. Such adjustments ensure that IoT devices can maintain their connection quality without experiencing interference or reduced transmission power, which may compromise their performance. In some embodiments, the presence of radar signals or the high probability of encountering incumbent users on the 5/6 GHz band may necessitate switching from the 5/6 GHz band to the 2.4 GHz band for the new TID X. Regulatory requirements for dynamic frequency selection (DFS) in these bands to protect radar operations may make them less reliable for continuous IoT operations due to the potential for sudden channel non-availability. In such configurations, the 2.4 GHz band becomes a safer choice for IoT traffic, as it is generally free from such regulatory requirements.

By dynamically adjusting or renegotiating the links mapped to the new TID X (305-9) in response to these conditions (e.g., battery status, sleep pattern, co-channel interference, EIRP limitations, and the presence of radar signals or incumbent users), the AP ensures that IoT devices can operate efficiently under varying conditions. In some embodiments, the dynamic adjustment (or renegotiation) in the TID-to-link mapping scheme 300 may be communicated by the AP to the STAs within its coverage area through beacon frames (before association) or management or action frames (after association). The communication ensures that all STAs (including IoT or non-IoT devices) are aware of the updated mapping, and use the appropriate links for their data transmission and/or reception.

Figure 4:
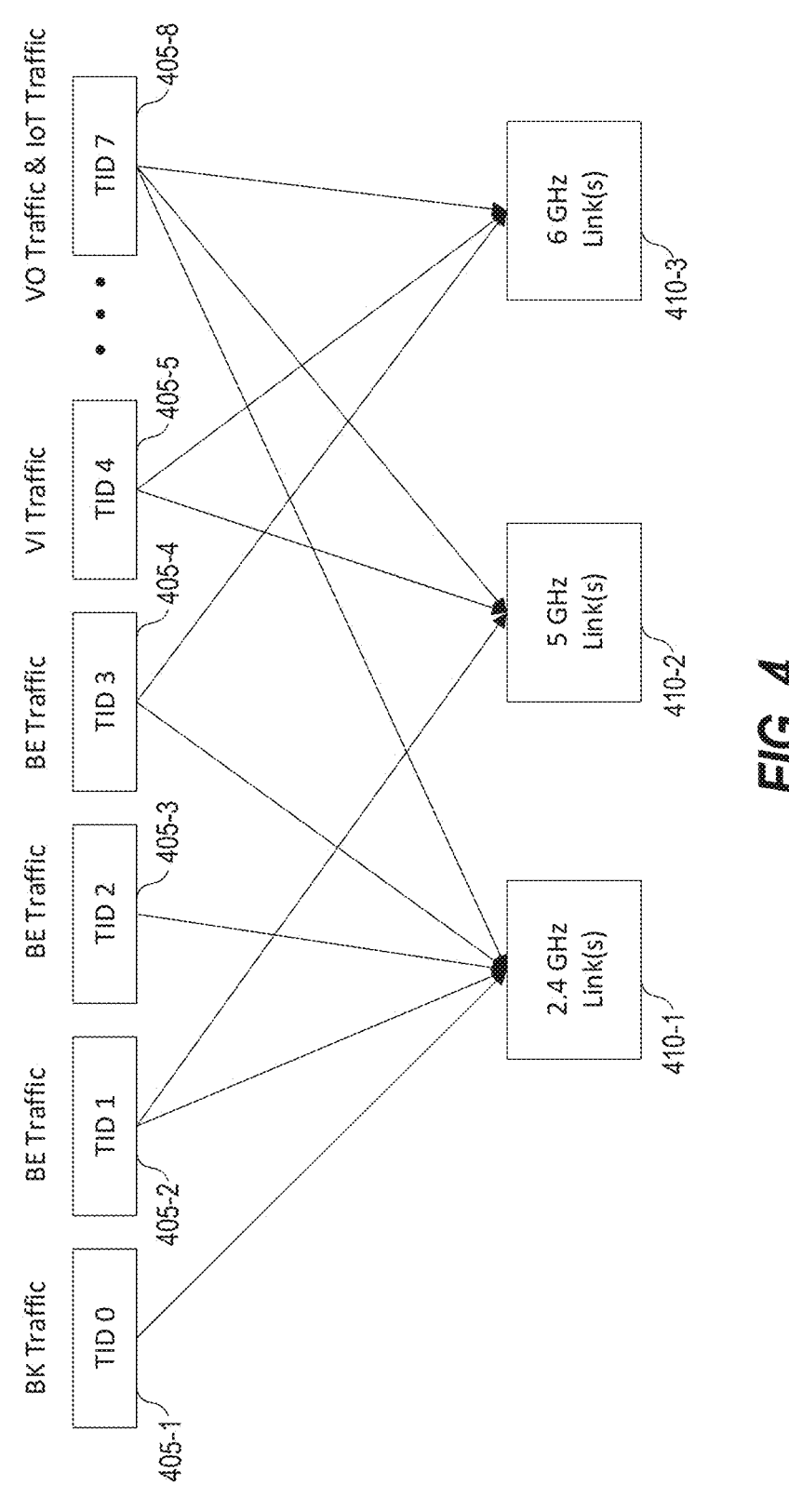
FIG. 4 depicts an example TID-to-link mapping scheme with IoT traffic mapped to a predefined TID, according to some embodiments of the present disclosure.

FIG. 4 depicts an example TID-to-link mapping scheme 400 with IoT traffic mapped to a predefined TID, according to some embodiments of the present disclosure.

In the example TID-to-link mapping scheme 400, similar to scheme 300 (as depicted in FIG. 3), BK traffic is allocated to TID 0 (405-1), and mapped to links operating on the 2.4 GHz band (410-1) (e.g., links 1 and 4 of FIG. 2). BE traffic is allocated across TIDs 1-3, where TID 1 (405-2) is allowed to access both 2.4 GHz (410-1) and 5 GHz links (410-2) (e.g., links 2 and 5 of FIG. 2), TID 2 (405-3) is restricted to 2.4 GHz links, and TID 3 (405-4) has access to both 2.4 GHz (410-1) and 6 GHz links (410-3) (e.g., links 3 and 6 of FIG. 2). VI traffic is allocated to TID 4 (405-5), and mapped to links operating on the 5 GHz (410-2) and 6 GHz bands (410-3). Unlike scheme 300 (as depicted in FIG. 1), where a new TID is created exclusively for IoT traffic, the TID mapping scheme 400 assigns IoT traffic to the existing TID 7 (405-8), which was originally allocated for VO (or low-latency) traffic (e.g., 135 of FIG. 1) from non-IoT devices. TID 7 (405-8) is then mapped to access links across multiple frequency bands (e.g., 2.4 GHz, 5 GHz, and 6 GHz). In the illustrated example, TID 7 (405-8) is mapped to access all available links, including 2.4 GHz links (410-1), 5 GHz links (410-2), and 6 GHz links (410-3).

In some embodiments, an AP (e.g., 105 of FIG. 1) may dynamically update the TID mapping scheme 400 to coordinate IoT (e.g., 150 of FIG. 1) and non-IoT traffic (e.g., voice or low-latency traffic 135 of FIG. 1) under TID 7. Since the TID 7 is mapped to access links across multiple frequency bands, the AP may dynamically allocate IoT traffic to one of the available frequency bands (e.g., 2.4 GHz, 5 GHz, and 6 GHz), while reserving the other bands for non-IoT traffic. When deciding the most suitable frequency band for transmitting IoT traffic, the AP may consider a variety of factors, including the current traffic loads of IoT and non-IoT devices and their specific QoS requirements, the conditions of available bands (e.g., network congestion levels, co-channel interference severity, potential radar signal disruptions or incumbent user presence, and any EIRP budget limitations), and the compatibility of IoT devices.

In the illustrated example, the non-IoT traffic originally allocated for TID 7 includes voice traffic, which typically has stringent requirements for latency and reliability and therefore should be given priority over IoT traffic. If the AP determines that non-IoT traffic presents a high demand, it may reserve the 6 GHz band for non-IoT traffic, directing IoT traffic to either 5 GHz or 2.4 GHz links, depending on device compatibility and network conditions. If the AP determines that there is low demand for non-IoT traffic and IoT devices support the 6 GHz band, the system may allocate 6 GHz links to IoT traffic. Given that IoT traffic generally involves small volumes that do not consume significant airtime, allocating IoT traffic to the 6 GHz band is unlikely to adversely affect the performance of non-IoT traffic on the same band. However, in embodiments where IoT traffic begins to consume excessive airtime and therefore negatively impact the performance for non-IoT clients, especially those requiring low-latency, the AP may decide to move the IoT traffic out of TID 7 and into a separate and newly created TID.

To facilitate the decision, the AP may collect and analyze measurements at the medium access control (MAC) layer data level, focusing on the airtime consumption of IoT traffic and the key performance indicators (KPIs) for low-latency traffic. Based on these measurements, the AP can make an informed decision on the allocation of frequency bands (particularly for the 6 GHz band) and decide whether it is necessary to remove IoT traffic from TID 7.

In some embodiments, the dynamic adjustment in the TID-to-link mapping may be communicated by the AP to STAs (including IoT devices and/or non-IoT devices) through various mechanisms. For example, before association, the AP may use beacon frames to broadcast the updated TID-to-link mapping information to all STAs within its coverage area. After association, the AP may communicate updates to the TID-to-link mapping to individual STAs using management or action frames. The STAs, upon receiving the updated TID mapping, may adjust their operations to transmit or receive different types of traffic streams using the different allocated links. The communication allows STAs to optimize their network usage based on the current TID-to-link configuration, to ensure efficient management of both IoT or non-IoT traffic flows.

Figure 5:
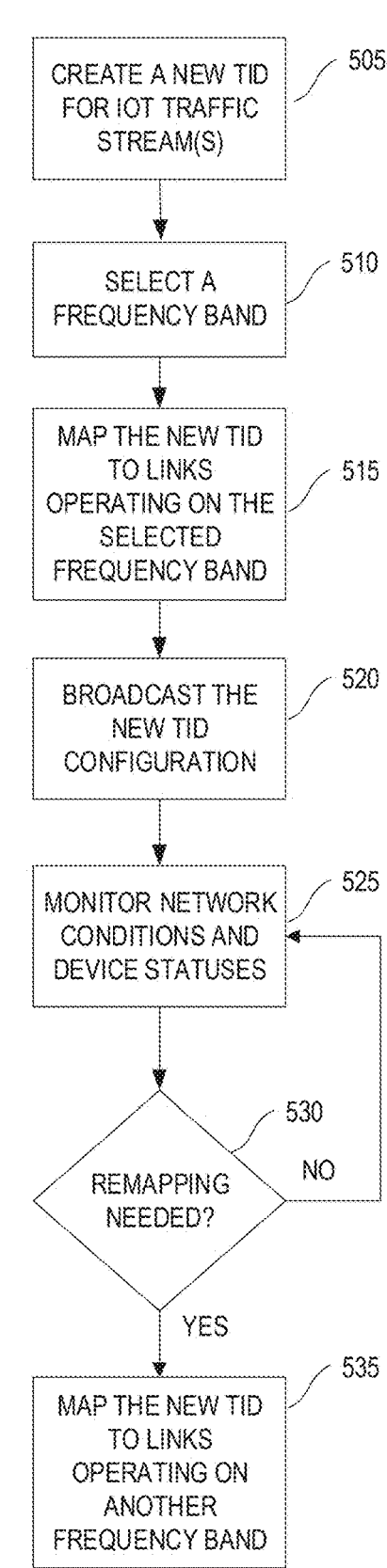
FIG. 5 depicts an example method of an AP dynamically creating new TIDs based on the presence of IoT devices to optimize network performance and power usage, according to some embodiments of the present disclosure.

FIG. 5 depicts an example method 500 of an AP dynamically creating new TIDs based on the presence of IoT devices to optimize network performance and power usage, according to some embodiments of the present disclosure. In some embodiments, the method 500 may be performed by one or more APs, such as AP 105 as depicted in FIG. 1, and the AP MLD 205 as depicted in FIG. 2. In some embodiments, the method 500 may be performed by one or more other network devices that possess the required capabilities for dynamic network management, such as wireless controllers (WLCs), routers, network switches, and the like.

At block 505, an AP (e.g., 105 of FIG. 1) creates a new TID (e.g., TID X of FIG. 3) for traffic streams generated by IoT devices (e.g., 150 of FIG. 1), regardless of the varying priorities and/or QoS requirements of these streams. The new TID may separate IoT traffic from network traffic generated by non-IoT devices (e.g., BK traffic 120, BE traffic 125, VI traffic 130, and VO traffic 135 of FIG. 1).

In some embodiments, the AP may define the priority of the TID within the network's existing QoS framework. The prioritization may be determined based on the QoS requirements of IoT traffic being managed. As discussed, IoT traffic (e.g., 105 of FIG. 1) is an aggregation of a variety of traffic streams from different applications, ranging from low latency and high reliability necessary for real-time processing (e.g., low-latency traffic 140 of FIG. 1) to more relaxed requirements for other types of data (e.g., BK/BE/VI traffic 145 of FIG. 1). Despite the diversity in QoS demands, common characteristics of IoT traffic are its generally small data volumes and minimal airtime consumption. Therefore, the assignment of a priority level for an IoT-specific TID (e.g., TID X of FIG. 3) may be flexible, since assigning it to any specific level would not significantly affect overall network performance. In embodiments where IoT traffic includes streams that require low latency, the priority for the IoT-specific TID (e.g., TID X of FIG. 3) may be set at a level comparable to voice traffic or slightly lower, to ensure important communications are effectively supported. In embodiments where the IoT traffic includes streams without such stringent latency requirements, the priority may be aligned with that of VI, BE, or BK traffic.

At block 510, after creating the new TID for IoT traffic, the AP selects a frequency band for the new TID, considering factors like IoT device compatibility (e.g., the spectrums supported), the status of available frequency bands and their network conditions, and the specific QoS requirements (e.g., latency, reliability, throughput) of the IoT traffic streams. By mapping this new TID to links operating on a single frequency band, the IoT devices (associated with the AP) (e.g., 115 of FIG. 5) may avoid (or at least reduce) the need to conduct frequent link switching when managing IoT traffic streams with varying priorities and QoS requirements. Therefore, the strategic allocation allows for a more stable and efficient network experience for IoT devices, accommodating their unique communication needs.

As discussed above, in some embodiments, such as when multiple IoT devices are associated with the same AP, each potentially supporting different frequency bands, the AP may ensure that the frequency band mapped to the new TID is the LCD across all connected IoT devices. For example, if five IoT devices are connected to the same AP, with three supporting 2.4 GHz and 5 GHz, and the other two only supporting 2.4 GHz, the LCD among the supported frequency bands of the five connected IoT devices is 2.4 GHz. Selecting the 2.4 GHz band for the new TID guarantees that every IoT device within the network can utilize the selected band, and therefore ensure broad compatibility and seamless operations. In embodiments where the LCD identifies more than one suitable band, the AP may proceed to evaluate the network conditions of each band to make a more informed decision. Various factors may be considered, including, but not limited to, the current traffic load of each band (where congested bands should be avoided to ensure smooth IoT operations), the co-channel interference (bands with high interference levels are less desirable due to potential communication disruptions), the EIRP limitations, and/or the presence of radar signals or incumbent users detected on each band. In some embodiments, the specific QoS requirements of the IoT traffic streams may also be evaluated to align the selected frequency band more closely with their performance needs. After analyzing these factors, the AP may select the band that provides the optimal balance of performance and reliability for IoT traffic, considering not only device compatibility but also broader network environments and regulatory constraints.

At block 515, the AP maps the new TID to links that operate on the selected frequency band. The updated TID-to-link mapping ensures that any traffic marked within the new TID is routed through the specified operational links for data transmission and/or reception. For example, when the 5 GHz is determined as the most suitable for IoT traffic at block 510, based on factors like device compatibility, network conditions, and QoS requirements, at block 515, the AP maps the new TID to 5 GHz links (e.g., links 2 and 5 of FIG. 2). In embodiments where both the AP (e.g., AP MLD 205 of FIG. 2) and its associated STA (e.g., STA MLD 215 of FIG. 2) support MLO, the "5 GHz links" may refer to the wireless connections established between one pair of AP and STA radio interfaces that operate in the 5 GHz band (e.g., link 2 of FIG. 2). Since both devices are MLDs, they can maintain multiple such links across different bands, but for the purpose of the new TID, only the links on the 5 GHz band are used to transmit and/or receive IoT traffic. In embodiments where the AP is an MLD (e.g., AP MLD 205 of FIG. 2) associated with a STA operating in eMLSR (such that the STA uses a single radio interface that can switch between bands but does not maintain multiple concurrent links across them) (e.g., single-link STA 225 of FIG. 2), the "5 GHz links" may refer to the dynamic selection mechanism where the signal radio of the STA is configured to switch to the 5 GHz band for IoT traffic marked with the new TID (e.g., link 5 of FIG. 2).

At block 520, the AP broadcasts the new TID-to-link mapping scheme (e.g., 300 of FIG. 3) to all STAs within its coverage area. The communication ensures that all connected devices (including IoT devices and/or non-IoT devices) are aware of the updated configurations and can appropriately utilize the designated links for IoT traffic. The communication may be achieved through beacon frames (before association) or management/action frames (after association).

At block 525, the AP monitors the network conditions of the selected band (such as co-channel interference, EIRP constraints, and the presence of radar signals or incumbent users), and/or the status of IoT devices (such as their battery status and extended sleep patterns). The AP may use the collected data to evaluate whether the current TID-to-link mapping remains optimal (or efficient), and/or if adjustments are necessary to accommodate the changing conditions.

At block 530, the AP determines whether remapping the new TID to a different frequency band is needed (or desired) based on the continuous monitoring of network conditions and the status of IoT devices. The remapping is implemented to maintain optimal performance of IoT traffic in response to changing conditions. For example, when IoT devices enter energy conservation modes or initiate extended sleep patterns, the AP may consider switching the new TID from a higher frequency band, such as 5/6 GHz, to the 2.4 GHz band. The 2.4 GHz band requires less power for signal transmission due to its longer range and better penetration, and therefore is more favorable than the 5/6 GHz bands for reducing power usage and preserving battery life. Switching to the 2.4 GHz band may better accommodate the energy-saving objectives of IoT devices. In embodiments where adverse conditions are detected on 5/6 GHz bands, such as high levels of co-channel interference, significant reductions in the EIRP budget, the detection of radar signals, or the presence of incumbent users, the AP may decide to remap the new TID to the 2.4 GHz band. Such remapping may mitigate the negative impacts of these conditions by utilizing the 2.4 GHz band's broader compatibility and potentially less stringent regulatory constraints. If the assessment concludes that remapping is needed for maintaining optimal performance of IoT traffic, the method 500 proceeds to block 535, where the new TID is mapped to access links operating on a more suitable frequency band (e.g., switching from 5/6 GHz to 2.4 GHz). If the AP determines there is no need for remapping, the method 500 returns to block 525, where the AP continues to monitor the network conditions and the status of IoT devices.

Figure 6:
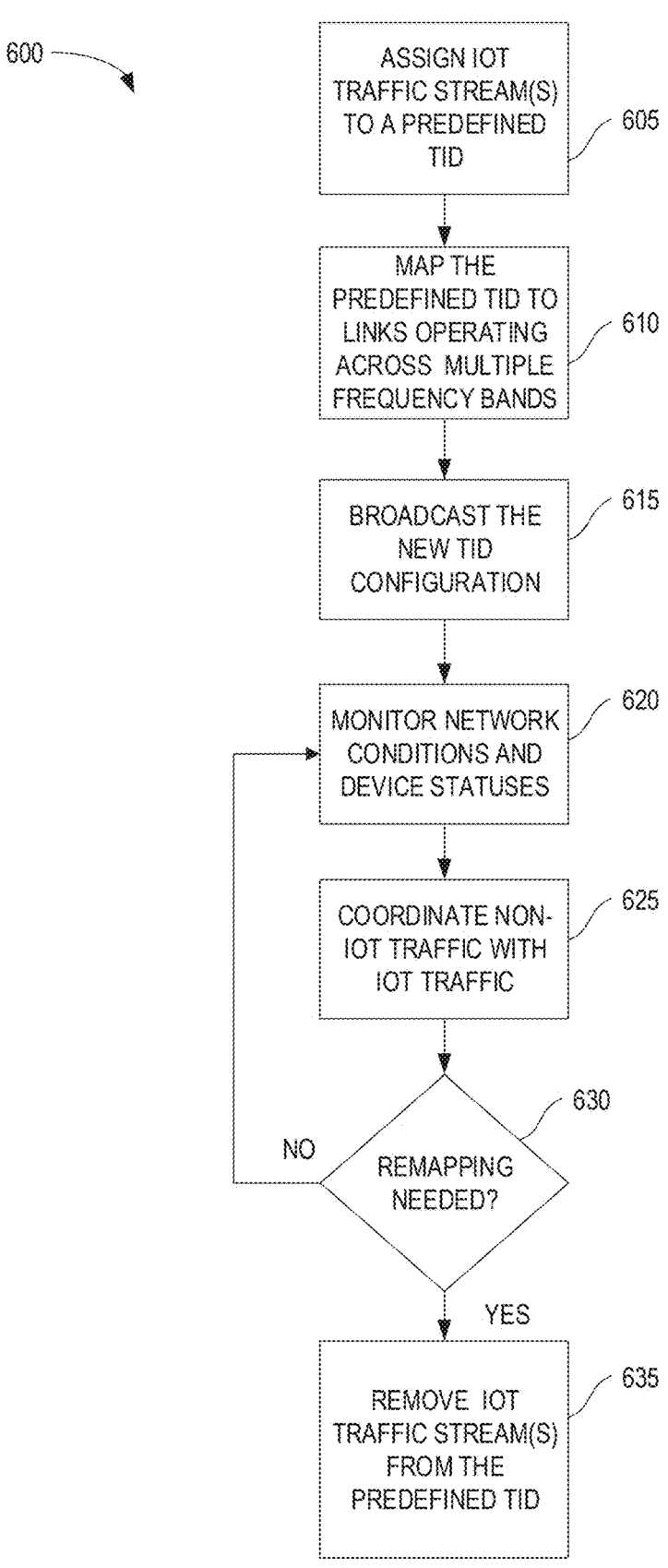
FIG. 6 depicts an example method of an AP strategically mapping IoT traffic to predefined TIDs to optimize network performance and power usage, according to some embodiments of the present disclosure.

FIG. 6 depicts an example method 600 of an AP strategically mapping IoT traffic to predefined TIDs to optimize network performance and power usage, according to some embodiments of the present disclosure. In some embodiments, the method 600 may be performed by one or more APs, such as AP 105 as depicted in FIG. 1, the AP MLD 205 as depicted in FIG. 2. In some embodiments, the method 600 may be performed by one or more other network devices that possess the required capabilities for dynamic network management, such as wireless controllers (WLCs), routers, network switches, and the like.

At block 605, an AP (e.g., 105 of FIG. 1) assigns traffic streams from IoT devices (regardless of their distinct QoS requirements) to a predefined or existing TID, such as TID 7 (e.g., 405-8 of FIG. 4), which was initially reserved for voice (or low-latency) traffic (e.g., 135 of FIG. 1). The assignment to an existing TID integrates the IoT traffic into the network's existing QoS framework, using established priorities and bandwidth allocations.

At block 610, the AP maps the predefined TID (like TID 7) to links operating across multiple frequency bands (e.g., 2.4 GHz, 5 GHz, and 6 GHz). In some embodiments, the predefined TID is mapped to access all available links between the AP and its associated STA, including 2.4 GHz links, 5 GHz links, and 6 GHz links (as depicted in FIG. 4).

At block 615, the AP broadcasts the updated TID-to-link mapping scheme (e.g., 400 of FIG. 4) to all STAs (including IoT devices and/or non-IoT devices) within its coverage area, using either beacon frames (before association) or management/action frames (after association). The communication ensures that all devices within the BSS are informed that IoT traffic is categorized under the predefined TID (such as TID 7), and/or the specific links across the frequency spectrum it can be routed through.

At block 620, the AP monitors the network conditions of the bands to which the predefined TID is mapped (e.g., 2.4 GHz, 5 GHz, 6 GHz), and the status of IoT devices connected to the network. This includes evaluating a range of factors such as congestion levels, co-channel interference levels, EIRP limitations, and the presence of radar signals or incumbent users on the available frequency bands, as well as monitoring the status of IoT devices such as battery life, operational modes, and sleep patterns. Based on the data collected, the AP assesses the efficiency of the current TID-to-link mapping scheme, and/or identifies any adjustments needed to maintain an optimal balance between the performance of IoT and non-IoT traffic flows under the predefined TID (such as TID 7).

At block 625, the AP coordinates the non-IoT traffic with the IoT traffic under the same TID. As used herein, the non-IoT traffic refers to the traffic that originally allocated to the predefined TID (like TID 7) from non-IoT devices (e.g., voice/low-latency 135 of FIG. 1). Since the predefined TID is now mapped to access links across multiple frequency bands, in some embodiments, the AP may dynamically allocate IoT traffic to one band while reserving the other bands for non-IoT traffic. The coordination ensures that both types of traffic are optimally served without interference. As used herein, "served" refers to the traffic being transmitted, received, or both transmitted and received (concurrently or sequentially) by the STAs or APs.

Within the coordination process, the AP may consider the priorities of the non-IoT and IoT traffic, as well as their respective demands (or loads) on the network. In some embodiments, the priorities for non-IoT and IoT traffic may be determined by assessing their respective QoS requirements. Considering that voice traffic (originally allocated to TID 7) typically requires low latency and high reliability, non-IoT traffic is generally given a higher priority level than IoT traffic when both are allocated to TID 7. If the AP determines that non-IoT traffic (e.g., 135 of FIG. 1), which has higher priority over IoT traffic (e.g., 150 of FIG. 1), presents with high demand, it may reserve the 6 GHz band exclusively for the non-IoT traffic, and/or map the IoT traffic to either the 2.4 GHz or 5 GHz bands, depending on which band offers better service compatibility and favorable network conditions. The dynamic allocation allows the AP to manage network resources more effectively, to ensure that high-priority non-IoT traffic is not adversely affected by the presence of IoT traffic within the same TID.

At block 630, the AP determines whether adjustments are required in the current TID-to-link mapping scheme (e.g., 400 of FIG. 4). As previously discussed, IoT traffic typically consists of small data volumes that do not consume significant airtime. Therefore, allocating IoT traffic to the predefined TID (such as TID 7 that also carries non-IoT traffic like voice or low-latency data) would not degrade the performance of non-IoT traffic due to the minimal impact of IoT data on overall network load. However, challenges may arise where IoT traffic begins to consume excessive airtime, which adversely affects the performance of non-IoT traffic (e.g., 135 of FIG. 1) also mapped to the predefined TID (such as TID 7). In such configurations, remapping becomes necessary. The method 600 then proceeds to block 635, where the AP moves IoT traffic streams out of the predefined TID and/or into a separate and newly created TID (specifically designed for IoT traffic) (e.g., TID X (305-9) of FIG. 3). The removal ensures that IoT and non-IoT traffic can each be served effectively without mutual interference. If the AP determines that no remapping is needed, such that IoT traffic continues to maintain low airtime consumption and does not negatively impact the performance of non-IoT traffic under the same TID, the method 600 returns to block 620, where the AP continues to monitor network conditions and device status. The cyclical process of monitoring, evaluation, and adjusting (if necessary) ensures that the network remains responsive to changing conditions and demands. By dynamically managing TID-to-link mappings, the AP can optimize network performance, accommodate the evolving needs of both IoT and non-IoT traffic, and maintain a high-quality service for all users.

Figure 7:
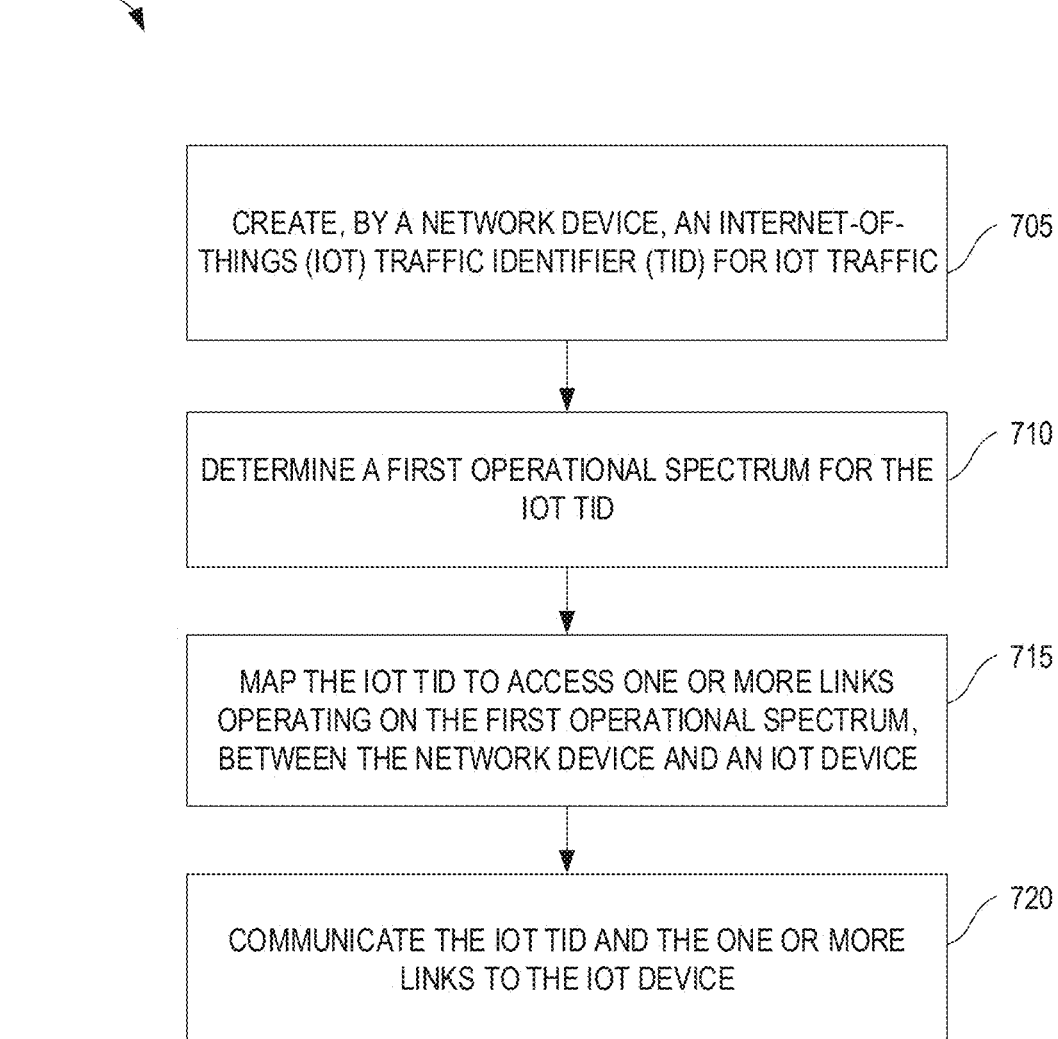
FIG. 7 is a flow diagram depicting an example method for TID mapping, with new TIDs allocated for IoT traffic, according to some embodiments of the present disclosure.

FIG. 7 is a flow diagram depicting an example method for TID mapping, with new TIDs allocated for IoT traffic, according to some embodiments of the present disclosure.

At block 705, a network device (e.g., AP 105 of FIG. 1) creates an Internet-of-things (IoT) traffic identifier (TID) (e.g., TID X (305-9) of FIG. 3), by a network device, for IoT traffic (e.g., 150 of FIG. 1). In some embodiments, the network device may comprise at least one of a multi-link access point (AP) or a router.

At block 710, the network device determines a first operational spectrum for the IoT TID (as depicted at block 510 of FIG. 5). In some embodiments, the first operational spectrum for the IoT TID may be selected from one of a 2.4 GHz frequency band, a 5 GHz frequency band, or a 6 GHz frequency band.

At block 715, the network device maps the IoT TID to access one or more links operating on the first operational spectrum (e.g., links 235 of FIG. 2), between the network device and an IoT device (e.g., 115 of FIG. 1). In some embodiments, the IoT device may communicate the IoT traffic (e.g., 150 of FIG. 1) to the network device using the one or more links operating on the first operational spectrum.

At block 720, the network device communicates the IoT TID and the one or more links to the IoT device (as depicted at block 520 of FIG. 5). In some embodiments, the IoT TID and the one or more links may be communicated from the network device to IoT device using one or more beacon frames.

In some embodiments, the network device may define a priority of the IoT TID within a network transmission policy of the network device, based on one or more network characteristics of the IoT traffic, where the one or more network characteristics include at least one of a latency requirement, a bandwidth requirement, and a reliability requirement.

In some embodiments, prior to determining the first operational spectrum for the IoT TID, the network device may perform a network analysis by considering at least one of network characteristics of the IoT traffic, operational spectrums supported by the IoT device, or network traffic loads between the network device and the IoT device.

In some embodiments, the network device may switch the IoT TID to a second operational spectrum upon detecting at least one of network congestion, high-level co-channel interference, a presence of radar signals or incumbent users, a restriction in an Effective Isotropic Radiated Power (EIRP) budget on the first operational spectrum (as depicted at block 535 of FIG. 5).

In some embodiments, the network device may map the IoT TID to access one or more links operating on the second operational spectrum, between the network device and the IoT device.

FIG. 8 is a flow diagram depicting an example method for TID mapping, with IoT traffic mapped to predefined TIDs, according to some embodiments of the present disclosure.

At block 805, a network device (e.g., 105 of FIG. 1) assigns Internet-of-things (IoT) traffic to a predefined traffic identifier (TID) (e.g., TID 7 (405-8) of FIG. 4) used for high priority traffic (e.g., 135 of FIG. 1) from non-IoT devices (e.g., 110 of FIG. 1). In some embodiments, the network device may prioritize the high priority traffic over the IoT traffic in data transmission. In some embodiments, the network device may comprise at least one of a multi-link access point (AP) or a router.

At block 810, the first network device maps the predefined TID to access a plurality of links operating on two or more operational spectrums, between the network device and an IoT device (as depicted at block 610 of FIG. 6). In some embodiments, the two or more operational spectrums may comprise a 6 GHz frequency band, and at least one of a 2.4 GHz frequency band or a 5 GHz frequency band.

At block 815, the first network device communicates a new mapping of the predefined TID and the plurality of links to the IoT device (as depicted at block 615 of FIG. 6). In some embodiments, the new mapping of the predefined TID and the plurality of links may be communicated from the network device to the IoT device using one or more beacon frames.

In some embodiments, the network device may disassociate the high priority traffic (e.g., 135 of FIG. 1) from the predefined TID upon determining that the IoT traffic consumes airtime to an extent that compromises a performance of the high priority traffic.

Figures 9, 10:
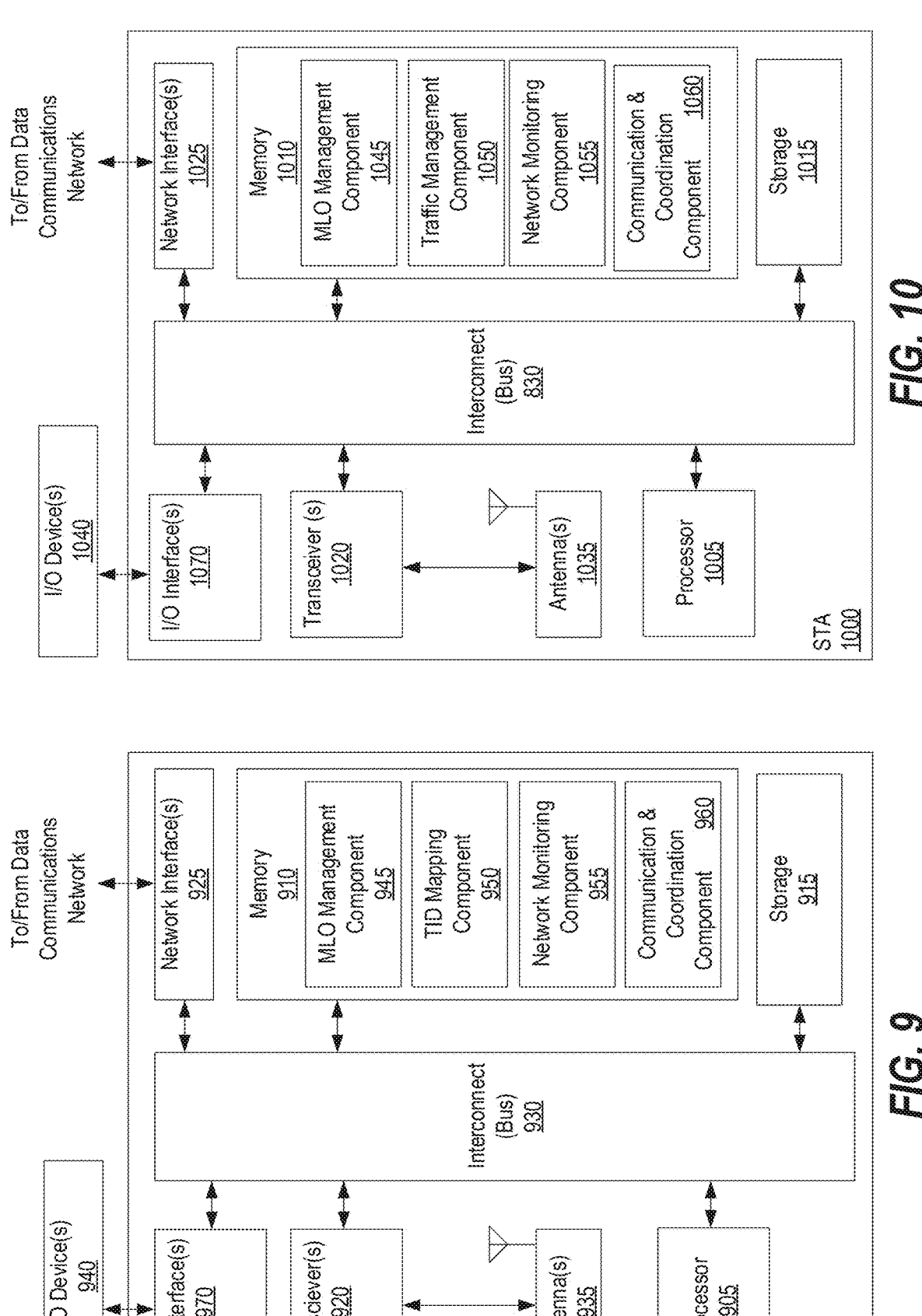
FIG. 9 depicts an example AP supporting dynamic TID mapping, according to some embodiments of the present disclosure.
FIG. 10 depicts an example client device supporting dynamic TID mapping, according to some embodiments of the present disclosure.

FIG. 9 depicts an example AP supporting dynamic TID mapping, according to some embodiments of the present disclosure. In some embodiments, the example AP 900 may correspond to the AP 105 as depicted in FIG. 1, and the AP MLD 205 as depicted in FIG. 2.

As illustrated, the example AP 900 includes a processor 905, memory 910, storage 915, one or more transceivers 920, one or more I/O interfaces 970, and one or more network interfaces 925. In some embodiments, I/O devices 940 are connected via the I/O interface(s) 970. Further, via the network interface 925, the AP 900 can be communicatively coupled with one or more other devices and components (e.g., via a network, which may include the Internet, local network(s), and the like). Each of the components is communicatively coupled by one or more buses 930. In some embodiments, one or more antennas 935 may be coupled to the transceivers 920 for transmitting and receiving wireless signals.

The processor 905 is generally representative of a single central processing unit (CPU) and/or graphic processing unit (GPU), multiple CPUs and/or GPUs, a microcontroller, an application-specific integrated circuit (ASIC), or a programmable logic device (PLD), among others. The processor 905 processes information received through the transceiver 920, I/O interfaces 970, and the network interfaces 925. The processor 905 retrieves and executes programming instructions stored in memory 910, as well as stores and retrieves application data residing in storage 915.

The storage 915 may be any combination of disk drives, flash-based storage devices, and the like, and may include fixed and/or removable storage devices, such as fixed disk drives, removable memory cards, caches, optical storage, network attached storage (NAS), or storage area networks (SAN). The storage 915 may store a variety of data for the efficient functioning of the system.

The memory 910 may include random access memory (RAM) and read-only memory (ROM). The memory 910 may store processor-executable software code containing instructions that, when executed by the processor 905, enable the AP 900 to perform various functions described herein for wireless communication. In the illustrated example, the memory 910 includes three software components: the MLO management component 945, the TID mapping component 950, the network monitoring component 955, and the communication and coordination component 960.

In some embodiments, the MLO management component 945 may handle the establishment, maintenance, and termination of multiple links (e.g., links 1-6 of FIG. 2) with devices that support MLO, including multi-link STAs (e.g., 215 of FIG. 2) and/or single-link STAs operating in eMLSR mode (e.g., 225 of FIG. 2). The MLO management component 945 may perform link aggregation and link selection based on the defined TID-to-link mapping scheme, and distribute different types of traffic across multiple frequency bands to optimize network performance and device connectivity.

In some embodiments, the TID mapping component 950 may be configured to manage the assignment of TID-to-link mappings within the network. The TID mapping component 950 may dynamically assign TIDs to specific frequency bands or links based on predefined rules or adaptive algorithms that consider various factors, such as device compatibility (e.g., the operational spectrums the device supports), battery status, QoS requirements of IoT traffic streams, and the network conditions of the available spectrums. In some embodiments, the TID mapping component 950 may distinguish IoT traffic from non-IoT traffic by assigning it to a separate and newly created TID (e.g., TID X of FIG. 3). To streamline network performance and minimize the need for frequent switching, the component 950 may map the IoT TID to links operating on a single frequency band, therefore optimizing the IoT devices' performance and/or reducing power usage and network complexity. In some embodiments, the TID mapping component 950 may allocate IoT traffic to an existing TID (e.g., TID 7 of FIG. 4) that has access to links across multiple frequency bands. The component 950 may then coordinate the data exchange of non-IoT and IoT traffic under the same TID across the multiple frequency bands, to maintain the performance or quality service of both types of traffic without causing interference to each other.

In some embodiments, the network monitoring component 955 may monitor network conditions and IoT device status to determine the efficiency of the current TID-to-link mapping scheme and identify any adjustments needed. In some embodiments, the network monitoring component 955 collects data on traffic load, signal quality, co-channel interference, EIRP limitations, and the presence of radar signals or incumbent users across different frequency bands. In some embodiments, the component 955 may also monitor the battery status of IoT devices, as well as their operational modes (e.g., energy conservation mode) and sleep patterns (e.g., extended sleep patterns that are TWT initiated). Based on the collected data, the network monitoring component 955 can make informed decisions regarding TID-to-link mappings, frequency band selection, and the need for any adjustments in the network configuration to maintain or enhance service quality.

In some embodiments, the communication and coordination component 960 may facilitate communication between the AP and connected STAs. The component 960 may transmit updates regarding TID-to-link mapping to the connected STAs through beacon frames or management/action frames. The component 960 ensures all devices are consistently informed about the network's current TID-to-link mapping scheme and can adjust their operation accordingly.

Although depicted as a discrete component for conceptual clarity, in some embodiments, the operations of the depicted components (and others not illustrated) may be combined or distributed across any number of components. Further, although depicted as software residing in memory 910, in some aspects, the operations of the depicted components (and others not illustrated) may be implemented using hardware, software, or a combination of hardware and software.

FIG. 10 depicts an example client device 1000 supporting dynamic TID mapping, according to some embodiments of the present disclosure. In some embodiments, the example client device 1000 may correspond to the non-IoT device 110 or IoT device 115 as depicted in FIG. 1. In some embodiments, the example client device 1000 may correspond to the STA MLD 215 or the single-link STA 225 as depicted in FIG. 2.

As illustrated, the example client device 1000 includes a processor 1005, memory 1010, storage 1015, one or more transceivers 1020, one or more I/O interfaces 1070, and one or more network interfaces 1025. In some embodiments, I/O devices 1040 are connected via the I/O interface(s) 1070. Further, via the network interface 1025, the client device 1000 can be communicatively coupled with one or more other devices and components (e.g., via a network, which may include the Internet, local network(s), and the like). Each of the components is communicatively coupled by one or more buses 1030. In some embodiments, one or more antennas 1035 may be coupled to the transceivers 1020 for transmitting and receiving wireless signals.

The processor 1005 is generally representative of a single central processing unit (CPU) and/or graphic processing unit (GPU), multiple CPUs and/or GPUs, a microcontroller, an application-specific integrated circuit (ASIC), or a programmable logic device (PLD), among others. The processor 1005 processes information received through the transceiver

1020, I/O interfaces 1070, and the network interfaces 1025. The processor 1005 retrieves and executes programming instructions stored in memory 1010, as well as stores and retrieves application data residing in storage 1015.

The storage 1015 may be any combination of disk drives, flash-based storage devices, and the like, and may include fixed and/or removable storage devices, such as fixed disk drives, removable memory cards, caches, optical storage, network attached storage (NAS), or storage area networks (SAN). The storage 1015 may store a variety of data for efficient functioning of the system.

The memory 1010 may include random access memory (RAM) and read-only memory (ROM). The memory 1010 may store processor-executable software code containing instructions that, when executed by the processor 1005, enable the client device 1000 to perform various functions described herein for wireless communication. In the illustrated example, the memory 1010 includes three software components: the MLO management component 1045, the traffic management component 1050, the network monitoring component 1055, and the communication and coordination component 1060.

In some embodiments, the MLO management component 1045 may manage the establishment, maintenance, and termination of multiple links (e.g., links 1-3 of FIG. 2) with an associated AP (e.g., 105 of FIG. 1). The MLO management component 945 may adhere to the defined TID-to-link mapping scheme, and distribute different types of traffic across these links to optimize network performance. When the example client device 1000 is a single-link device (including one radio interface) but associated with a MLD AP (e.g., 205 of FIG. 2), the MLO management component 1045 may enable the client device 1000 to operate in an eMLSR mode, managing the switch between different frequency bands dynamically based on the TID-to-link mapping scheme communicated by the associated MLD AP.

In some embodiments, the traffic management component 1050 may interpret and adhere to the TID-to-link mapping instructions received from the AP (e.g., AP MLD 205 of FIG. 2). The component 1050 may ensure that the client device 1000 routes its traffic through the appropriate links, based on the TID mappings, to align with the network's QoS and operational priorities.

In some embodiments, the network monitoring component 1055 may monitor the wireless environment and the STA 1000's own operational status, including battery life, signal quality or strength, and available network resources. The component 1055 may adapt the STA 1000's link usage, power-saving settings, and other operational parameters in response to these conditions to further optimize performance and efficiency.

In some embodiments, the communication and coordination component 1060 may be configured to handle communication between the client device 1000 and its associated AP. For example, the component 1060 may manage the exchange of information related to TID-to-link mapping updates through beacon frames or management/action frames, and/or send acknowledgements to inform the AP of the successful reception of the updates. The component 1060 ensures that the client device 1000 remains synchronized with the network's current TID mapping scheme, allowing it to adjust the operations based on the instructions received.

Although depicted as a discrete component for conceptual clarity, in some embodiments, the operations of the depicted components (and others not illustrated) may be combined or distributed across any number of components. Further, although depicted as software residing in memory 910, in some aspects, the operations of the depicted components (and others not illustrated) may be implemented using hardware, software, or a combination of hardware and software.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
detecting, by a network device, a presence of Internet-of-things (IoT) traffic and non-IoT traffic within a wireless network;
creating, by the network device, an IoT traffic identifier (TID) for the IoT traffic, wherein the IoT TID is different from one or more predefined TIDs used for the non-IoT traffic;
determining, by the network device, a first operational spectrum for the created IoT TID;
mapping, by the network device, the created IoT TID to access one or more links operating on the determined first operational spectrum, between the network device and an IoT device; and communicating, by the network device, the mapped IoT TID and the accessed one or more links to the IoT device.

2. The method of claim 1, further comprising defining, by the network device, a priority of the created IoT TID within a network transmission policy of the network device, based on one or more network characteristics of the IoT traffic, wherein the one or more network characteristics include at least one of a latency requirement, a bandwidth requirement, and a reliability requirement.

3. The method of claim 1, wherein the first operational spectrum for the created IoT TID is selected from one of a 2.4 GHz frequency band, a 5 GHz frequency band, or a 6 GHz frequency band.

4. The method of claim 1, further comprising, prior to determining the first operational spectrum for the created IoT TID, performing a network analysis by considering at least one of network characteristics of the IoT traffic, operational spectrums supported by the IoT device, or network traffic loads between the network device and the IoT device.

5. The method of claim 1, wherein the IoT device communicates the IoT traffic to the network device using the accessed one or more links operating on the first operational spectrum.

6. The method of claim 1, further comprising switching the created IoT TID to a second operational spectrum upon detecting at least one of network congestion, high-level co-channel interference, a presence of radar signals or incumbent users, a restriction in an Effective Isotropic Radiated Power (EIRP) budget on the first operational spectrum.

7. The method of claim 6, further comprising, mapping the created IoT TID to access one or more links operating on the second operational spectrum, between the network device and the IoT device.

8. The method of claim 1, wherein the mapped IoT TID and the accessed one or more links are communicated from the network device to the IoT device using one or more beacon frames.

9. The method of claim 1, wherein the network device comprises at least one of a multi-link access point (AP) or a router.

10. A method, comprising:
detecting, by a network device, a presence of Internet-of-things (IoT) traffic and non-IoT traffic within a wireless network;
assigning, by the network device, the IoT traffic to a predefined traffic identifier (TID) used for high priority non-IoT traffic;
mapping, by the network device, the predefined TID to access a plurality of links operating on two or more operational spectrums, between the network device and an IoT device; and
communicating, by the network device, a new mapping of the mapped predefined TID and the plurality of links to the IoT device.

11. The method of claim 10, further comprising prioritizing, by the network device, the high priority traffic over the IoT traffic in data transmission.

12. The method of claim 10, wherein the two or more operational spectrums comprise a 6 GHz frequency band, and at least one of a 2.4 GHz frequency band or a 5 GHz frequency band.

13. The method of claim 10, further comprising disassociating, by the network device, the high priority traffic from the mapped predefined TID upon determining that the IoT traffic consumes airtime to an extent that compromises a performance of the high priority traffic.

14. The method of claim 10, wherein the new mapping of the mapped predefined TID and the plurality of links are communicated from the network device to the IoT device using one or more beacon frames.

15. The method of claim 10, wherein the network device comprises at least one of a multi-link access point (AP) or a router.

16. A system comprising:

one or more computer processors; and one or more memories collectively containing one or more programs, which, when executed by the one or more computer processors, perform operations, the operations comprising:

detecting, by a network device, a presence of Internet-of-things (IoT) traffic and non-IoT traffic within a wireless network;

creating, by the network device, an IoT traffic identifier (TID) for the IoT traffic, wherein the IoT TID is different from one or more predefined TIDs used for the non-IoT traffic;

determining, by the network device, a first operational spectrum for the created IoT TID;

mapping, by the network device, the created IoT TID to access one or more links operating on the determined first operational spectrum, between the network device and an IoT device; and communicating, by the network device, the mapped IoT TID and the accessed one or more links to the IoT device.

17. The system of claim 16, wherein the one or more programs, which, when executed by the one or more computer processors, perform the operations further comprising defining, by the network device, a priority of the created IoT TID within a network transmission policy of the network device, based on one or more network characteristics of the IoT traffic, wherein the one or more network characteristics include at least one of a latency requirement, a bandwidth requirement, and a reliability requirement.

18. The system of claim 17, wherein the IoT device communicates the IoT traffic to the network device using the accessed one or more links operating on the first operational spectrum.

19. The system of claim 17, wherein the one or more programs, which, when executed by the one or more computer processors, perform the operations further comprising switching the created IoT TID to a second operational spectrum upon detecting at least one of network congestion, high-level co-channel interference, a presence of radar signals or incumbent users, a restriction in an Effective Isotropic Radiated Power (EIRP) budget on the first operational spectrum.

20. The system of claim 16, wherein the one or more programs, which, when executed by the one or more computer processors, perform the operations further comprising, prior to determining the first operational spectrum for the created IoT TID, performing a network analysis by considering at least one of network characteristics of the IoT traffic, operational spectrums supported by the IoT device, or network traffic loads between the network device and the IoT device.

\* \* \* \* \*